(12) United States Patent
Hess, Jr. et al.

(10) Patent No.: US 9,591,299 B2
(45) Date of Patent: Mar. 7, 2017

(54) SURVEILLANCE CAMERAS WITH TEST PORTS AND RELATED SYSTEMS AND METHODS

(71) Applicant: WirePath Home Systems, LLC, Charlotte, NC (US)

(72) Inventors: Galen Paul Hess, Jr., Waxhaw, NC (US); Vernon H. Furr, Charlotte, NC (US); Jon Aslaksen, Monroe, NC (US)

(73) Assignee: Wirepath Home Systems, LLC, Charlotte, NC (US)

( * ) Notice: Subject to any disclaimer, the term of this patent is extended or adjusted under 35 U.S.C. 154(b) by 0 days.

(21) Appl. No.: 14/477,107

(22) Filed: Sep. 4, 2014

(65) Prior Publication Data

US 2015/0070494 A1    Mar. 12, 2015

Related U.S. Application Data

(60) Provisional application No. 61/874,485, filed on Sep. 6, 2013.

(51) Int. Cl.
*G08B 13/196* (2006.01)
*H04N 17/00* (2006.01)
*H04N 5/225* (2006.01)
*H04N 5/232* (2006.01)

(52) U.S. Cl.
CPC ....... *H04N 17/002* (2013.01); *G08B 13/1968* (2013.01); *G08B 13/19636* (2013.01); *H04N 5/2252* (2013.01); *H04N 5/23219* (2013.01); *H04N 5/23241* (2013.01); *Y10T 29/49004* (2015.01)

(58) Field of Classification Search
CPC .......... G08B 13/19617; H04N 17/002; H04N 5/23241; H04N 5/23219; H04N 5/2252
USPC ..................... 396/427; 348/143; 29/893, 593
See application file for complete search history.

(56) References Cited

U.S. PATENT DOCUMENTS

| | | | |
|---|---|---|---|
| 4,695,930 A * | 9/1987 | Wierzbicki | F21V 9/06 362/293 |
| 2001/0015764 A1* | 8/2001 | Marchesini | G08B 13/19619 348/373 |
| 2007/0002143 A1* | 1/2007 | Elberbaum | H04N 17/002 348/188 |
| 2009/0315990 A1* | 12/2009 | Simmons | G08B 13/19636 348/143 |
| 2014/0267746 A1* | 9/2014 | Hertrich | H04N 7/181 348/159 |

* cited by examiner

*Primary Examiner* — Rochelle-Ann J Blackman
(74) *Attorney, Agent, or Firm* — Myers Bigel, P.A.

(57) ABSTRACT

A surveillance camera includes a primary power connection for electrically connecting the camera to a primary power source. The camera includes a housing and a test port in the housing. The test port includes a port connection for electrically connecting the camera to a secondary local power source such that the camera receives power from the secondary power source. The port connection is further for connecting the camera to a portable monitor such that video from the camera is displayed on the monitor when the camera is electrically connected to the secondary power source independent of whether the camera is electrically connected to the primary power source.

19 Claims, 8 Drawing Sheets

SURVEILLANCE CAMERAS WITH TEST PORTS AND RELATED SYSTEMS AND METHODS

RELATED APPLICATION

This application claims priority from U.S. Provisional Application No. 61/874,485, filed Sep. 6, 2013, the disclosure of which is hereby incorporated herein in its entirety.

BACKGROUND

Surveillance cameras are often designed to view a fixed scene, such as an area around a door, gate, or the like. The position of the camera relative to the scene may vary. Some cameras are designed with a varifocal lens. These cameras may have an optical zoom of 3-4x, allowing an installer to adjust the zoom depending on the distance of the camera installation to the scene to be captured. When the installer adjusts the zoom, the installer then must focus the camera to get a clear picture at the new focal position.

In such installations, zoom and focus are typically manual adjustments made at the camera. The camera's position and orientation also typically need to be adjusted slightly such that the camera is properly directed toward the scene. It is desirable to make such adjustments at the time of installation (e.g., while the installer is still on the ladder after mounting the camera in its desired location).

SUMMARY

Some embodiments of the present invention are directed to a surveillance camera including a primary power connection for electrically connecting the camera to a primary power source. The camera includes a housing and a test port in the housing. The test port includes a port connection for electrically connecting the camera to a secondary local power source such that the camera receives power from the secondary power source. The port connection is further for connecting the camera to a portable monitor such that video from the camera is displayed on the monitor when the camera is electrically connected to the secondary power source independent of whether the camera is electrically connected to the primary power source.

The secondary power source may be a portable power source, such as a 12V DC power source. The secondary power source may be a portable closed-circuit television (CCTV) tester including the monitor and a battery as the secondary power source.

In some embodiments, the camera is in combination with a test adapter. The test adapter has a first end configured to connect with the test port and a second, opposed end including a power connection for connection with the secondary power source and a video connection for connection with a portable monitor. The test adapter may include an on-screen display (OSD) controller between the first and second ends.

In some embodiments, the housing is generally cylindrical and the test port is located at an underside of the housing. The camera may include a removable cover over the test port. The cover may be tethered to the housing and/or may include a gasket that forms a seal when the cover is attached to the housing.

In some embodiments, the camera includes a base coupled to the housing, with the base being configured to be mounted to a mounting surface. The test port may be positioned to be accessible when the base is mounted to the mounting surface. The primary power connection may be included in a pigtail that extends from the housing and past the base. The camera may include a camera rotation adjustment mechanism for rotating the housing relative to the base, a camera swivel adjustment mechanism for swiveling the housing relative to the base, and/or a camera angle adjustment mechanism for adjusting an angle of the camera relative to the base.

The camera may include externally accessible zoom and focus adjustment mechanisms on the camera housing.

Some other embodiments of the present invention are directed to a surveillance camera system. The system includes a surveillance camera including a primary power connection for electrically connecting the camera to a primary power source. The camera includes: a cylindrical housing connected to a base, with the base being configured to be mounted to a mounting surface; and a test port in the housing, with the test port including a port connection. The system includes a secondary local power source, a portable monitor and a test adapter. The test adapter has a first end configured to connect with the test port and a second, opposed end including a power connection for connection with the secondary power source and a video connection for connection with the portable monitor. In operation, the first end of the test adapter is connected with the test port, the power connection of the test adapter is connected with the secondary power source, and the video connection of the test adapter is connected with the portable monitor such that the camera receives power from the secondary power source, and video from the camera is displayed on the monitor when the camera is electrically connected to the secondary, power source independent of whether the camera is electrically connected to the primary power source.

Some other embodiments of the present invention are directed to a method of installing a surveillance camera. The method includes providing a surveillance camera including a primary power connection for electrically connecting the camera to a primary power source. The camera includes: a cylindrical housing connected to a base, with the base configured to be mounted to a mounting surface; and a test port in the housing. The test port includes a port connection for electrically connecting the camera to a secondary local power source such that the camera receives power from the secondary power source. The port connection is further for connecting the camera to a portable monitor such that video from the camera is displayed on the monitor when the camera is electrically connected to the secondary power source independent of whether the camera is electrically connected to the primary power source. The method includes: mounting the camera base to a mounting surface at an installation site such that the camera is generally directed toward a scene for surveillance; connecting a local power supply to the port connection of the camera at the installation site such that local power is supplied to the camera that is not electrically connected to the primary power source; connecting a portable monitor to the port connection of the camera at the installation site such that video from the camera is displayed on the monitor; and adjusting the camera at the installation site based on the video displayed on the monitor.

In some embodiments, the method includes adjusting the zoom of the camera using an externally accessible zoom adjustment mechanism disposed on the camera housing and then adjusting the focus of the camera using an externally accessible focus adjustment mechanism disposed on the camera housing. In some embodiments, the method includes adjusting the camera including at least one of: rotating the housing relative to the base; swiveling the housing relative to the base; and adjusting an angle of the housing relative to the base.

Figure 1:
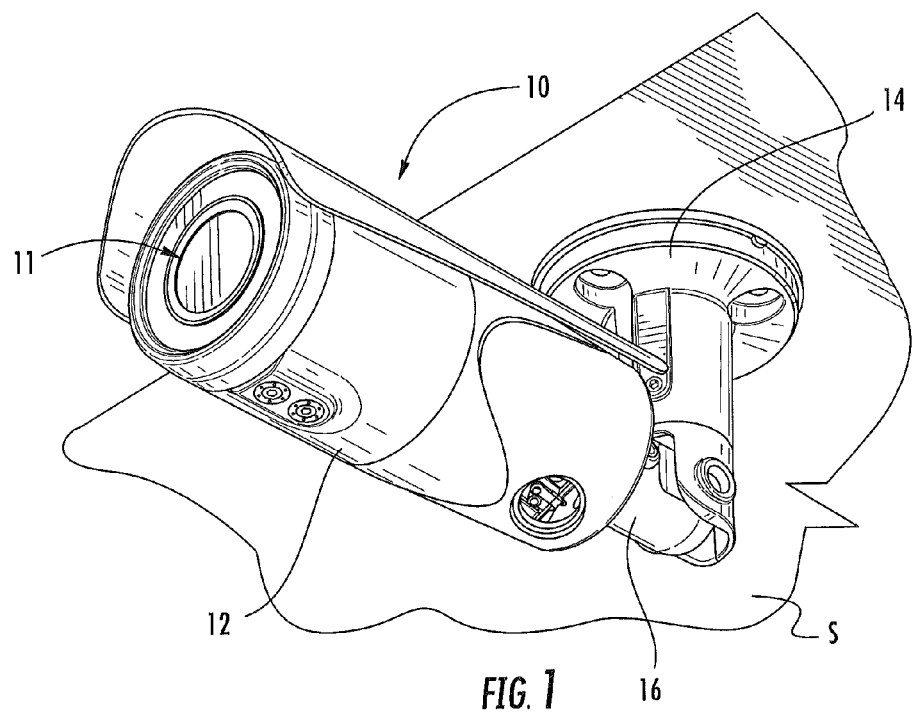
FIG. 1 is a bottom perspective view of a surveillance camera according to some embodiments.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

A surveillance camera 10 according to some embodiments is illustrated in FIGS. 1-4, 6 and 8. The camera 10 may be used to capture video from a scene, such as an area around a door, a gate, a window, and the like. The camera 10 includes a lens 11 that is directed toward the scene.

Referring to FIG. 1, the camera 10 has a housing 12. The camera 10 may be a "bullet" camera having a generally cylindrical housing 12. The housing 12 is connected to a base 14 by an arm 16. The base 14 is configured to be mounted to a mounting surface S, which may be a ceiling, a wall, an eave, an overhang, and the like.

Figure 2:
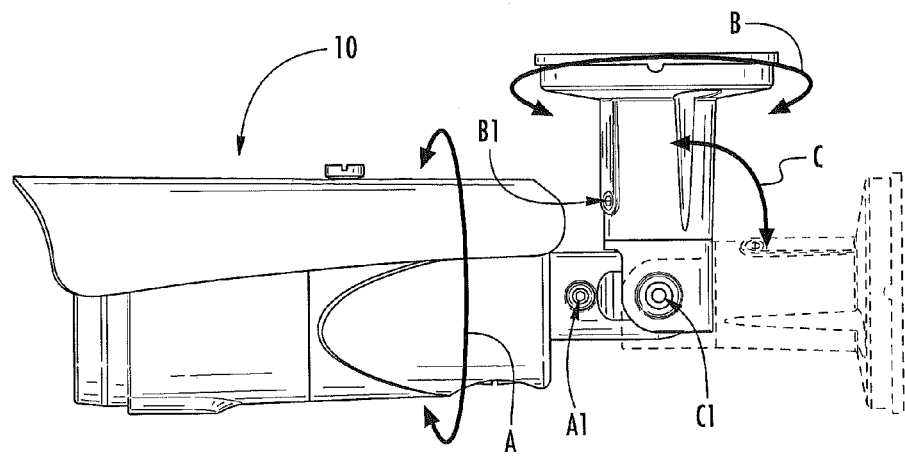
FIG. 2 is a side view of the camera of FIG. 1.

Turning to FIG. 2, the camera 10 may be pivoted, rotated and/or swiveled. Adjustment mechanisms A1, B1, C1 are provided to adjust the camera rotation as indicated by the arrow A, the camera swivel as indicated by the arrow B and the camera angle as indicated by the arrow C, respectively. Each adjustment mechanism A1, B1, C1 may include one or more fasteners (e.g., bolts, nuts, pins, screws, etc.).

Figure 3:
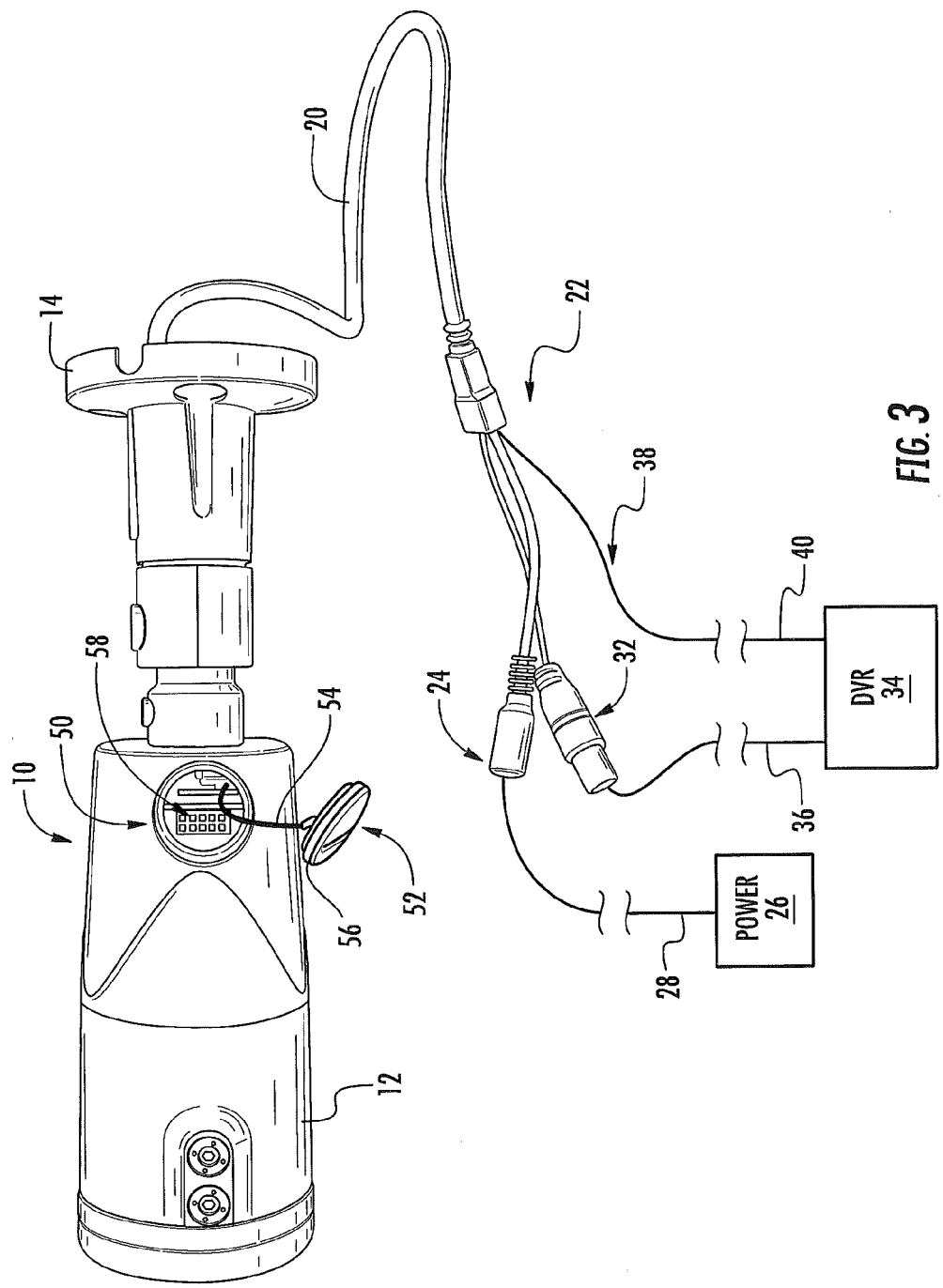
FIG. 3 is a bottom view of the camera of FIG. 1 illustrating head end gear connections according to some embodiments.

The camera 10 includes a primary power connection for electrically connecting the camera 10 to a main or primary power source. The primary power source is for powering the camera 10 during normal use (i.e., after installation). Turning to FIG. 3, the primary power connection may be included in a pigtail 20. The pigtail 20 extends from the camera housing 12 past and/or through the camera base 14.

A distal end portion 22 of the pigtail 20 includes connections for power and video. A power connector 24 (e.g., a 12V DC power in barrel connector) is used for connection to a main or primary power source 26, such as a 12V DC-24V AC power supply. The primary power source 26 may be located at the head end of the system and a power cable or wire 28 (e.g., 18-2 cable) extending therefrom may be connected to the power connector 24 (e.g., using a 2-wire adapter).

A video connector 32 (e.g., a BNC video out connector) may be connected to a digital video recorder (DVR) 34 using a cable 36 such as coaxial cable. RS485 on-screen display (OSD) control leads 38 may be connected to the DVR using a cable 40 such as Cat5e/Cat6 cable. The RS485 leads 38 may also be connected to a closed-circuit television (CCTV) tester or a pan-tilt-zoom (PTZ) controller, for example.

Figure 4:
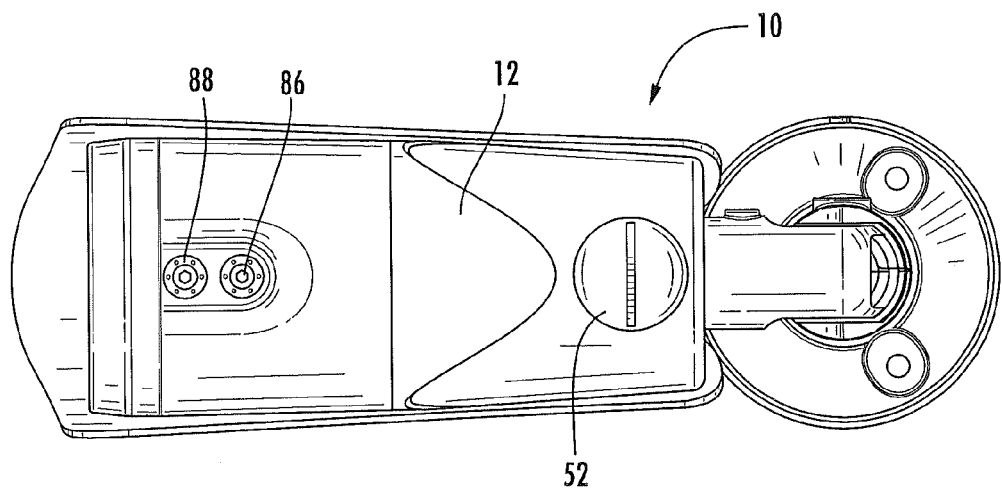
FIG. 4 is a bottom view of the camera of FIG. 1.

The camera 10 includes a test port 50 on the housing 12. The test port 50 may be disposed on a bottom portion of the housing 12. A cover or plate 52 is releasably attachable to the port 50. The cover 52 is shown detached from the housing 12 in FIG. 3 and is shown attached to the housing 12 in FIG. 4. The cover 52 may be tethered to the housing 12 by a tether 54. The cover 52 may include a gasket or seal 56 to form a seal between the cover 52 and the housing 12 when the cover 52 is attached thereto, as shown in FIG. 4. The camera 10 may be IP66 compliant (Ingress Protection Rating as published by the International Electrotechnical Commission) with the cover 52 attached to the housing 12. In such embodiments, the IP66-rated weatherproof housing makes the camera 10 suitable for outdoor surveillance.

Figure 5:
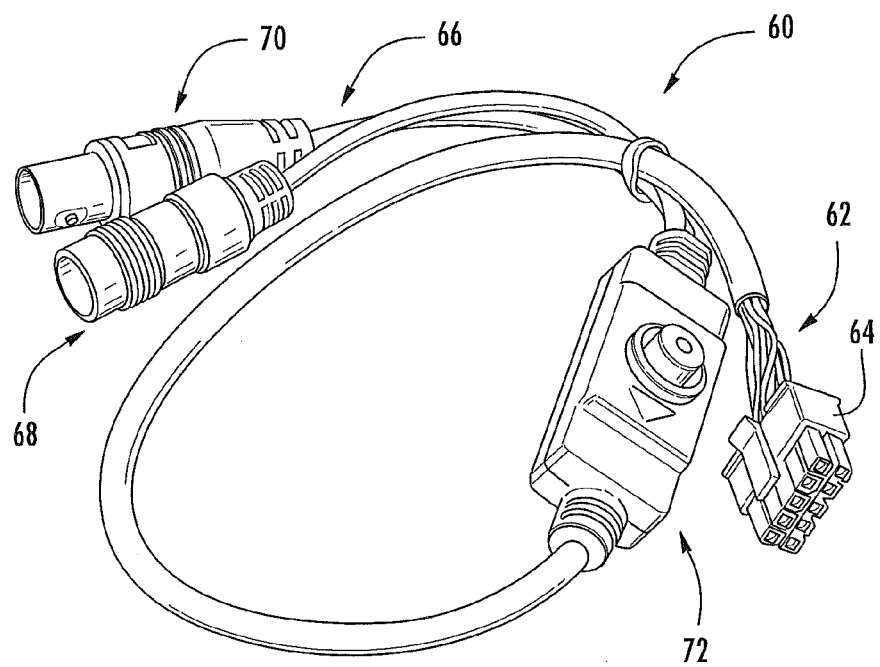
FIG. 5 is a perspective view of an adapter for use with the camera of FIG. 1 according to some embodiments.

The test port 50 includes a port connection 58 disposed in the housing 12. As illustrated, the port connection 58 may be a multi-pin connector or socket (e.g., a 10-pin connector). The port connection 58 is configured to connect to a first end 62 of a test adapter 60, which is shown in FIG. 5.

Figure 6:
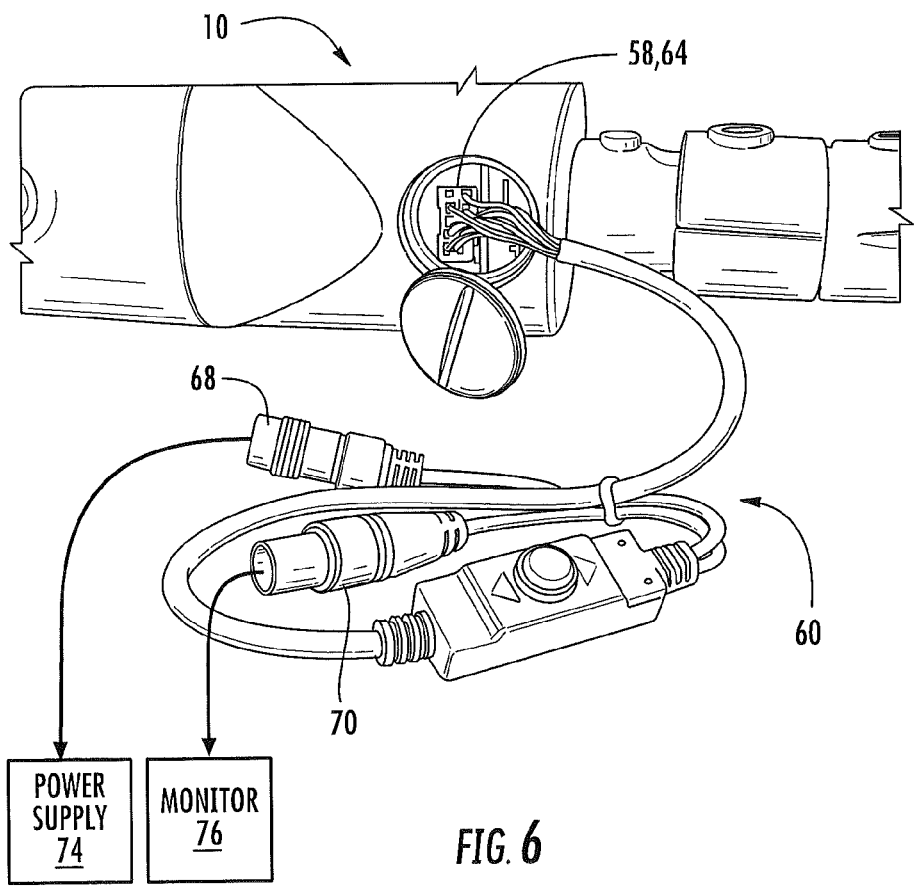
FIG. 6 is a partial bottom view of the adapter of FIG. 5 connected to the camera of FIG. 1.

The adapter first end 62 includes an adapter connection 64 that is connected to the port connection 58 (FIG. 6). The adapter connection 64 may be a multi-pin connector or socket (e.g., a 10-pin socket).

The adapter 60 has a second end 66. As illustrated, the adapter second end 66 includes a power connection 68 (e.g., a barrel plug) and a video connection 70 (e.g., a BNC connector). As illustrated in FIG. 6, the power connection 68 may be connected to a secondary or local power supply 74 to power the camera 10 (e.g., during installation). The secondary power supply 74 may be a 12V DC power supply. The secondary power supply may be a battery or include a battery. The video connection 70 may be connected to a portable monitor 76. As illustrated, the adapter 60 also includes an OSD controller 72 (e.g., an OSD joystick).

Figure 7:
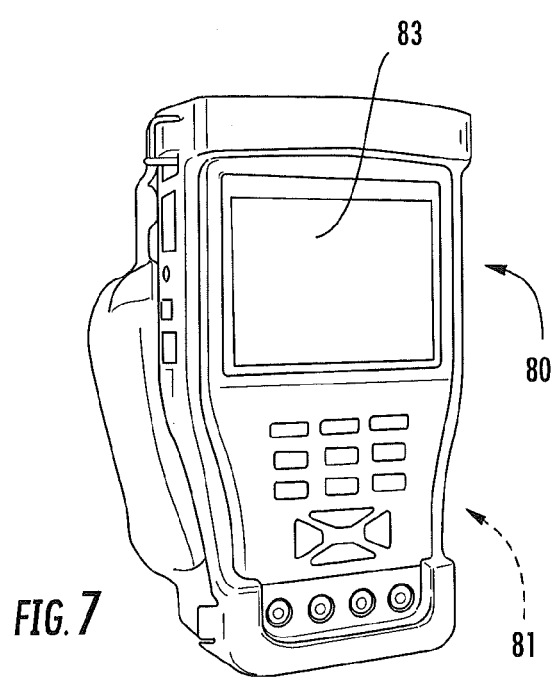
FIG. 7 is a perspective view of a closed-circuit television (CCTV) tester that may be used with the camera and connected adapter of FIG. 6 according to some embodiments.
Figure 8:
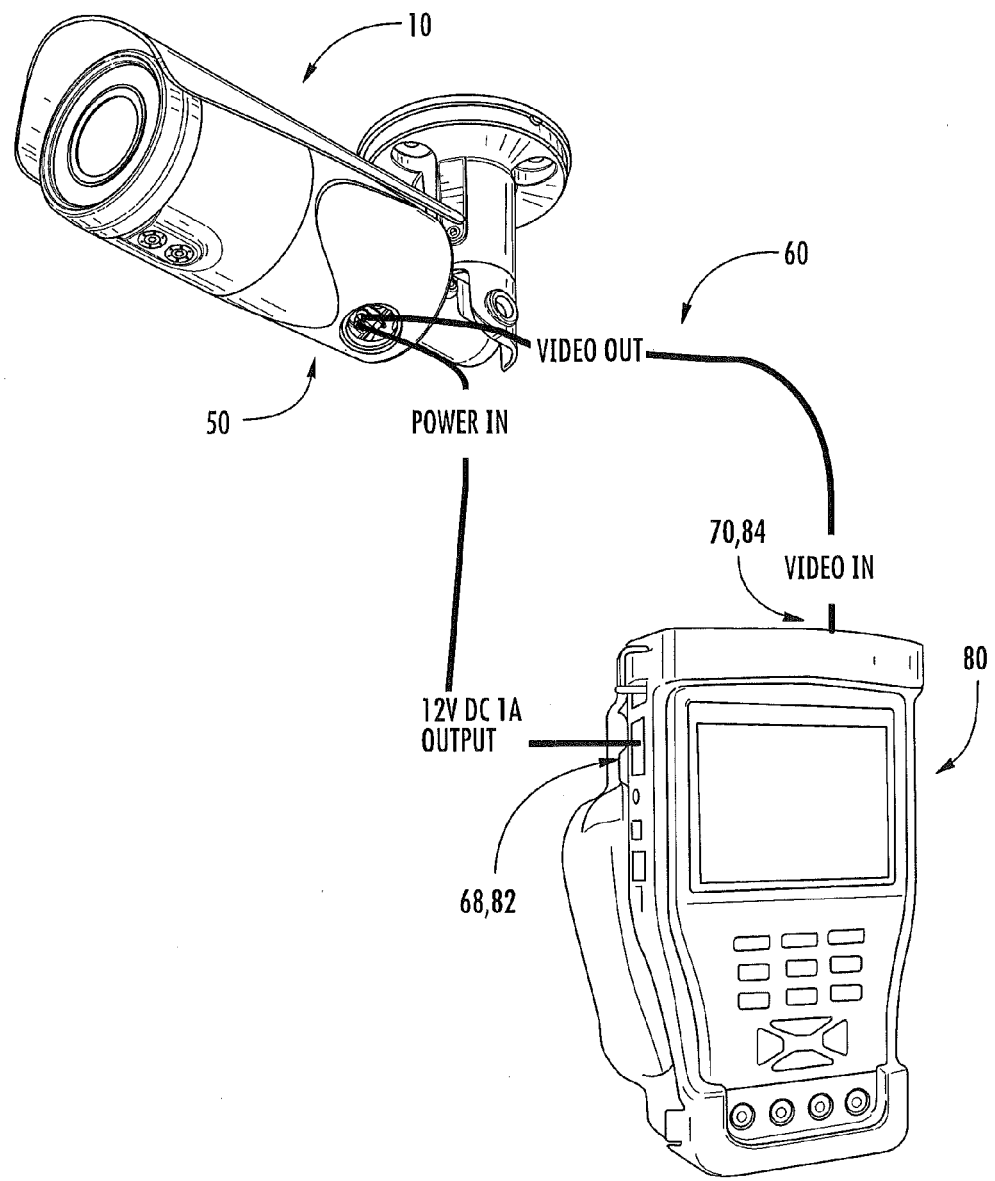
FIG. 8 is a schematic illustration of the camera of FIG. 1 connected to the CCTV tester of FIG. 7.

The power connection 68 and the video connection 70 may be connected to a separate secondary power source 74 and monitor 76, respectively. Alternatively, the power connection 68 and the video connection 70 may be connected to a combined secondary power supply and monitor, such as the closed-circuit television (CCTV) tester 80 shown in FIGS. 7 and 8. The CCTV tester 80 includes a power port 82 configured to receive the power connector 68 of the adapter 60 and a video port 84 configured to receive the video connector 70 of the adapter 60. The CCTV tester 80 includes an internal battery 81 and a monitor 83.

Referring back to FIG. 4, the camera 10 includes a zoom adjustment mechanism 86 and a focus adjustment mechanism 88. The zoom and focus mechanisms 86, 88 are externally accessible. As illustrated, the zoom and focus mechanisms 86, 88 may be disposed on a bottom surface of the camera housing 12. Each of the zoom and focus mechanisms 86, 88 may include one or more fasteners (e.g., bolts, nuts, pins, screws, etc.).

The test port 50 allows for local analog video output and local power to the camera 10 for adjusting camera positioning, zoom and focus. Therefore, the camera 10 may be adjusted directly from the installed location (e.g., by the installer on a ladder).

In use, and referring to FIGS. 2-8, the installer removes the cover 52 to access the port connection 58 of the camera 10. The installer connects the adapter connection 64 of the adapter 60 to the port connection 58. The installer connects the video connection 70 of the adapter 60 to the portable monitor 76 or the CCTV tester 80. The installer connects the local power supply 74 or the CCTV tester 80 to the power connection 68 of the adapter 60.

At this point, because the camera is locally powered, the installer may view the video output on the monitor and make necessary adjustments at the installation location. The installer may adjust the camera rotation, the camera swivel and/or the camera angle by adjusting the adjustment mechanisms A1, B1 and/or C1, respectively (FIG. 2). These adjustments may be made using an allen key or wrench, for example. The installer may adjust the camera zoom using the external zoom adjustment mechanism 86, and may also adjust the camera focus using the external focus adjustment mechanism 88. These adjustments may also be made using an alien key or wrench, for example.

The installer may also view an on-screen display (OSD) on the monitor 76 or the CCTV tester 80. The installer may use the OSD controller 72 of the adapter 60 to navigate through on-screen menus and make adjustments to features such as wide dynamic range (WDR), automatic gain control (AGC), dynamic noise reduction (DNR) and so forth.

It will be appreciated that the camera test port 50 and the secondary power supply allow the installer to perform on-the-spot video adjustments even if main power is not already provided to the camera. Installers often make the connections at the camera but do not have the "head end gear" installed to turn on the camera. Further, newly purchased homes or businesses (e.g., new construction) may not have power at the time of installation. The camera test port 50 provides for convenient and efficient installation of the surveillance camera(s) in such situations.

Figure 9:
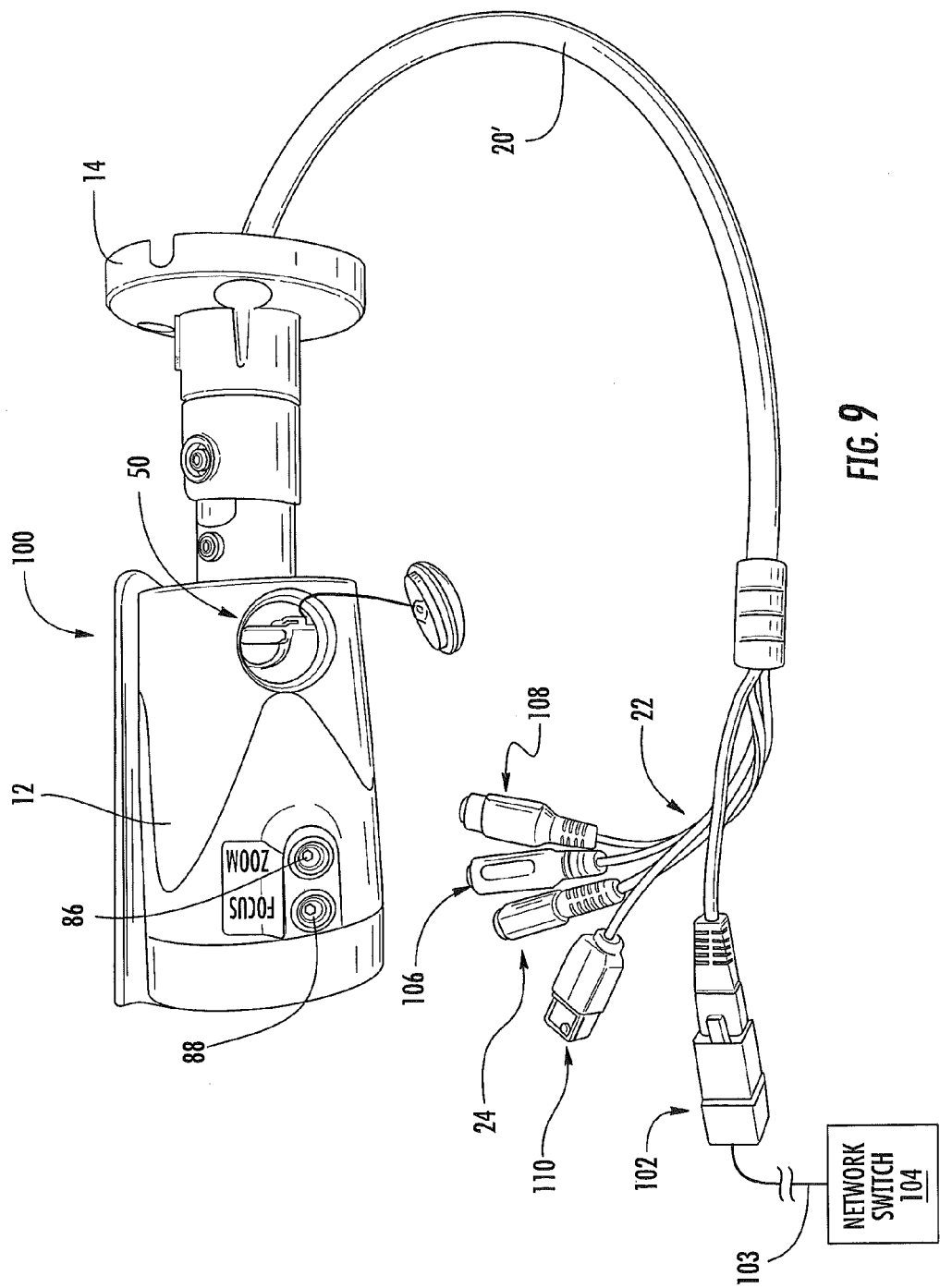
FIG. 9 is a bottom perspective view of a surveillance camera according to some other embodiments.
Figure 10:
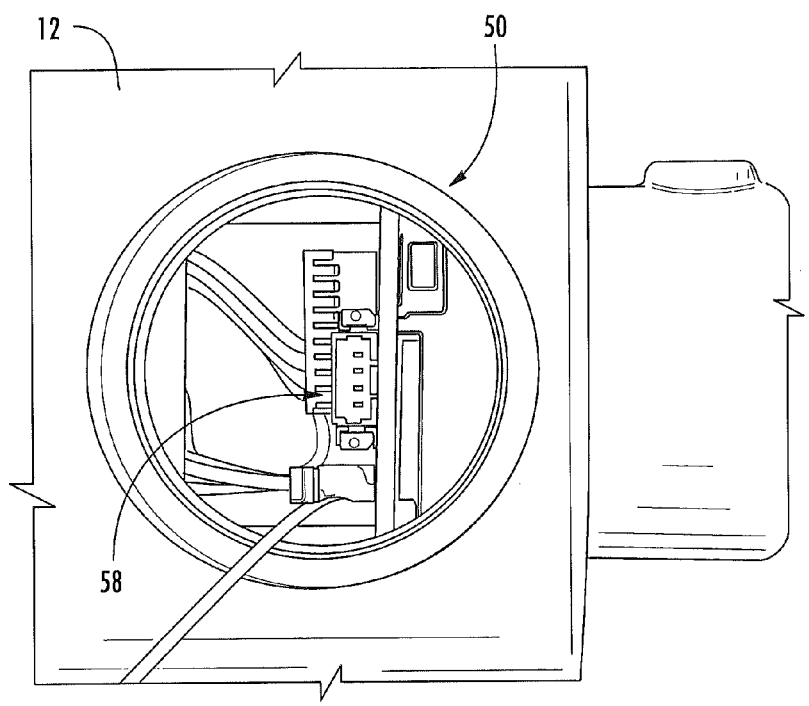
FIG. 10 is an enlarged partial view illustrating a test port of the camera of FIG. 9.

A surveillance camera 100 according to other embodiments is illustrated in FIGS. 9 and 10. The camera 100 shares the same advantages and features as the camera 10 with the following differences.

The camera 10 is an analog camera and the camera 100 is an internet protocol (IP) camera. The camera 100 includes a pigtail 20' that extends from the housing 12 past and/or through the base 14. A distal end portion 22 of the pigtail 20' includes connections for power, audio and video.

An Ethernet connection 102 may be connected to a network switch 104 via an Ethernet cable 103 (e.g., a Cat5e/Cat6 cable) for communication to and from the camera 100. The network switch 104 may be Power over Ethernet (PoE) enabled network switch. The network switch 104 may be powered by AC power. The Ethernet cable 103 may be configured to carry data, power and video. Thus, the camera 100 may be powered using PoE which supplies power via the Ethernet cable 103.

A DC power connector 24 (e.g., a 12V DC power in barrel connector) may be used for connection to a main or primary power source 26 (e.g., a 12V DC 1A power supply) as described above in reference to the camera 10. It is noted that this connection is not needed if PoE is used to power the camera 100.

Audio in connection 106 may be connected to a powered microphone to allow for listening to audio at the camera 100 location. Audio out connection 108 may be connected to an amplifier and speakers to allow for communication between the viewer and the camera 100 location. A contact and relay 110 (e.g., a spring loaded terminal) may be used to connect to devices with contact closure activation to trigger recording from the camera, or to activate devices such as sirens at the camera 100 location.

Figure 11:
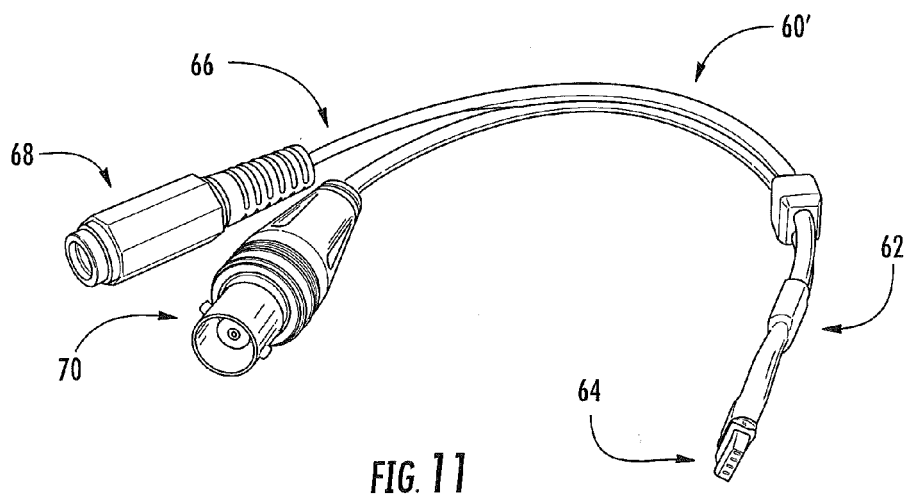
FIG. 11 is a perspective view of an adapter for use with the camera of FIG. 9 according to some embodiments.

Referring to FIGS. 9 and 10, the test port 50 includes a port connection 58 disposed in the housing 12. As illustrated, the port connection 58 may be a multi-pin connector or socket (e.g., a 4-pin connector). The port connection 58 is configured to connect to a first end 62 of a test adapter 60', which is shown in FIG. 11.

The adapter first end 62 includes an adapter connection 64 that is connected to the port connection 58. The adapter connection 64 may be a multi-pin connector or socket (e.g., a 4-pin socket).

The adapter 60' has a second end 66. As illustrated, the adapter second end 66 includes a power connection 68 (e.g., a barrel plug) and a video connection 70 (e.g., a BNC connector). Like the adapter 60 shown in FIGS. 6 and 8, the power connection 68 of the adapter 60' may be connected to a secondary or local power supply 74 or a CCTV tester 80 to locally power the camera 10 (e.g., during installation). The video connection 70 may be connected to a portable monitor 76 or the CCTV tester 80.

Therefore, like the camera 10, the test port 50 of the camera 100 allows for local power to the camera 100 and video output from the camera 100 for adjustment of the camera's orientation/position, zoom and focus (i.e., using the externally accessible zoom and focus adjustment mechanisms 86, 88). These adjustments may advantageously performed by the installer at the point of installation even though a main power connection has not been established.

Figure 12:
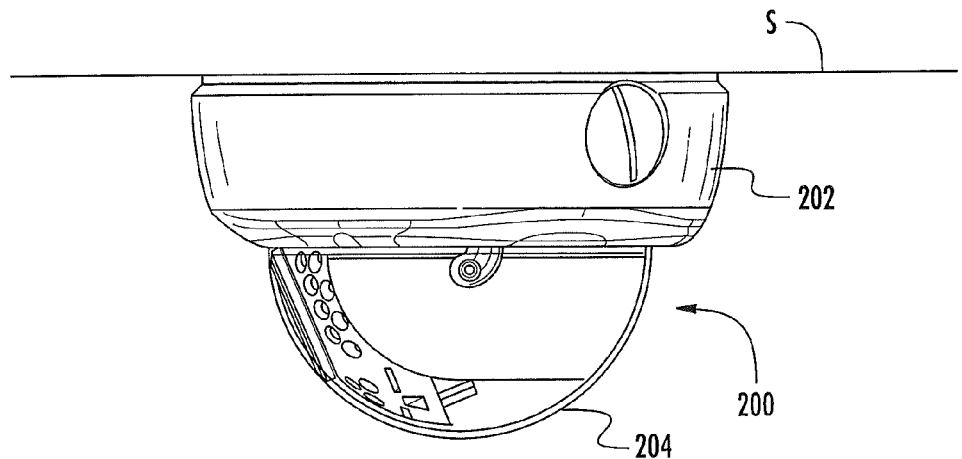
FIG. 12 is a side view of a surveillance camera according to some other embodiments.
Figure 13:
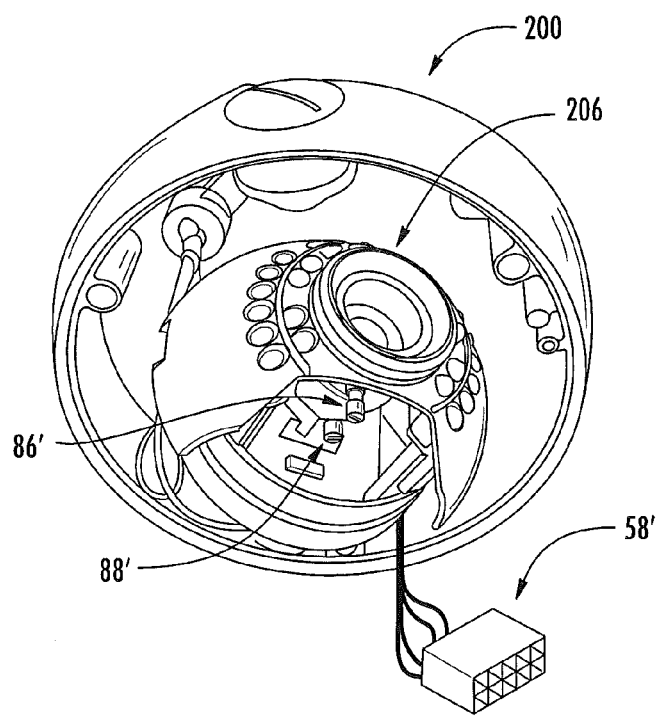
FIG. 13 is a bottom perspective view of the camera of FIG. 12.

Although "bullet" shaped surveillance cameras have been discussed, the local power and adjustments described above may be performed on other types of surveillance cameras, such as the "dome" shaped camera 200 shown in FIGS. 12 and 13. The camera 200 includes a base 202 and a cover 204. The camera base 202 may be mounted to a mounting surface S, such as a ceiling, an eave, an overhang, and the like. Although not illustrated, the camera 200 may include a pigtail, such as the pigtail 20 or 20' described above, which may extend away from the base 202 for main power and video connection. The camera includes a zoom adjustment mechanism 86' and a focus adjustment mechanism 88'. The camera lens 206 is rotatable to adjust the lens angle.

As shown in FIG. 13, the camera cover 204 may be removed to expose an adapter connection 58', which may be a multi-pin connector or socket, for example. The adapter connection 58' is configured to connect with an adapter, such as the adapters 60 and 60' described above. As such, local power may be supplied to the camera 200 and video may be output locally such that adjustments may be made locally at the installation site in a similar manner as described above in connection with the cameras 10 and 100.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A surveillance camera including a primary power connection for electrically connecting the camera to a primary power source, the camera comprising:
   a housing;
   a test port comprising an opening on the housing and a port connection in the housing for electrically connecting the camera to a secondary local power source such that the camera receives power from the secondary power source, the port connection further for connecting the camera to a portable monitor such that video from the camera is displayed on the monitor when the camera is electrically connected to the secondary power source independent of whether the camera is electrically connected to the primary power source;
   a base coupled to the housing;
   a camera angle adjustment mechanism on the base for adjusting an angle of the base relative to the housing between a first position wherein the base is mountable to a horizontal mounting surface with the test port positioned at an underside of the housing that is generally parallel to the horizontal mounting surface and a second position wherein the base is mountable to a vertical mounting surface with the test port positioned at the underside of the housing that is generally perpendicular to the vertical mounting surface; and
   a cover releasably attachable to the opening of the test port to enclose the housing, wherein the cover includes a gasket to form a seal between the cover and the housing when the cover is attached to the opening of the test port.

2. The surveillance camera of claim 1, wherein the secondary power source is a portable power source.

3. The surveillance camera of claim 2, wherein the secondary power source is a 12V DC power source.

4. The surveillance camera of claim 1, wherein the secondary power source is a portable closed-circuit television (CCTV) tester including the monitor and a battery as the secondary power source.

5. The surveillance camera of claim 1, wherein the test port connection is adapted to connect with a first end of a test adapter, a second end of the test adapter including a power connection for connection with the secondary power source and a video connection for connection with the portable monitor.

6. The surveillance camera of claim 1 in combination with a test adapter, the test adapter having a first end configured to connect with the test port connection and a second, opposed end including a power connection for connection with the secondary power source and a video connection for connection with the portable monitor.

7. The combination of claim 6, wherein the test adapter includes an on-screen display (OSD) controller between the first and second ends.

8. The surveillance camera of claim 1, wherein the housing is generally cylindrical.

9. The surveillance camera of claim 1, wherein the cover is tethered to the housing.

10. The surveillance camera of claim 1, further comprising externally accessible zoom and focus adjustment mechanisms on the camera housing.

11. The surveillance camera of claim 1, wherein the primary power connection is included in a pigtail that extends from the housing and past the base and/or through the base.

12. The surveillance camera of claim 1, further comprising a camera rotation adjustment mechanism for rotating the housing relative to the base and/or a camera swivel adjustment mechanism for swiveling the housing relative to the base.

13. The surveillance camera of claim 1, wherein the camera has an IP66 ingress protection rating as published by the International Electrotechnical Commission.

14. A surveillance camera system comprising:
a surveillance camera including a primary power connection for electrically connecting the camera to a primary power source, the camera further comprising:
a cylindrical housing connected to a base;
a test port comprising an opening on the housing and a port connection in the housing;
a camera angle adjustment mechanism on the base for adjusting an angle of the base relative to the housing between a first position wherein the base is mountable to a horizontal mounting surface with the test port positioned at an underside of the housing that is generally parallel to the horizontal mounting surface and a second position wherein the base is mountable to a vertical mounting surface with the test port positioned at the underside of the housing that is generally perpendicular to the vertical mounting surface; and
a cover releasably attachable to the opening of the test port to enclose the housing, wherein the cover includes a gasket to form a seal between the cover and the housing when the cover is attached to the opening of the test port;
a secondary local power source;
a portable monitor; and
a test adapter, the test adapter having a first end configured to connect with the test port and a second, opposed end including a power connection for connection with the secondary power source and a video connection for connection with the portable monitor;
wherein, in operation, the first end of the test adapter is connected with the test port, the power connection of the test adapter is connected with the secondary power source, and the video connection of the test adapter is connected with the portable monitor such that the camera receives power from the secondary power source, and video from the camera is displayed on the monitor when the camera is electrically connected to the secondary power source independent of whether the camera is electrically connected to the primary power source.

15. A method of installing a surveillance camera, the method comprising:
providing a surveillance camera including a primary power connection for electrically connecting the camera to a primary power source, the camera further comprising:
a cylindrical housing connected to a base, the base configured to be mounted to a mounting surface;
a test port in the housing, the test port including a port connection for electrically connecting the camera to a secondary local power source such that the camera receives power from the secondary power source, the port connection further for connecting the camera to a portable monitor such that video from the camera is displayed on the monitor when the camera is electrically connected to the secondary power source independent of whether the camera is electrically connected to the primary power source, wherein the test port is positioned to be accessible when the base is mounted to the mounting surface; and
a removable cover over the test port;
mounting the camera base to a mounting surface at an installation site such that the camera is generally directed toward a scene for surveillance;
connecting a local power supply to the port connection of the camera at the installation site such that local power is supplied to the camera that is not electrically connected to the primary power source;
connecting a portable monitor to the port connection of the camera at the installation site such that video from the camera is displayed on the monitor; and
adjusting the camera at the installation site based on the video displayed on the monitor.

16. The method of claim 15, wherein adjusting the camera comprises:
adjusting the zoom of the camera using an externally accessible zoom adjustment mechanism disposed on the camera housing; and then
adjusting the focus of the camera using an externally accessible focus adjustment mechanism disposed on the camera housing.

17. The method of claim 15, wherein adjusting the camera comprises at least one of:
rotating the housing relative to the base;
swiveling the housing relative to the base; and
adjusting an angle of the housing relative to the base.

18. The method of claim 15, wherein the local power supply comprises at least one of a battery, a DC power source and a 12V DC power source.

19. The method of claim 15, wherein the camera comprises a camera angle adjustment mechanism on the base for adjusting an angle of the base relative to the housing between a first position wherein the base is mountable to a horizontal mounting surface with the test port positioned at an underside of the housing that is generally parallel to the horizontal mounting surface and a second position wherein the base is mountable to a vertical mounting surface with the test port positioned at the underside of the housing that is generally perpendicular to the vertical mounting surface, and wherein mounting the camera base to a mounting surface at an installation site comprises either mounting the base to the horizontal mounting surface with the base in the first position or mounting the base to the vertical mounting surface with the base in the second position.

* * * * *

UNITED STATES PATENT AND TRADEMARK OFFICE
CERTIFICATE OF CORRECTION

PATENT NO. : 9,591,299 B2  
APPLICATION NO. : 14/477107  
DATED : March 7, 2017  
INVENTOR(S) : Hess, Jr. et al.

Page 1 of 1

It is certified that error appears in the above-identified patent and that said Letters Patent is hereby corrected as shown below:

On the Title Page

(71) Applicant: Please correct "WirePath Home Systems, LLC"  
to read -- WirePath Home Systems, LLC d/b/a SnapAV --

(73) Assignee: Please correct "Wirepath Home Systems, LLC"  
to read -- WirePath Home Systems, LLC d/b/a SnapAV --

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*